United States Patent [19]

Kosuge

[11] Patent Number: 5,253,999
[45] Date of Patent: Oct. 19, 1993

[54] ROTARY INJECTION MOLDING MACHINE
[75] Inventor: Satoru Kosuge, Komoro, Japan
[73] Assignee: Nissei Asb Machine Co., Ltd., Japan
[21] Appl. No.: 828,391
[22] Filed: Jan. 30, 1992
[30] Foreign Application Priority Data Jan. 31, 1991 [JP] Japan .................... 3-32354

[51] Int. Cl.⁵ ............................................. B29C 45/06
[52] U.S. Cl. ............................. 425/575; 264/538; 425/576
[58] Field of Search ............... 425/534, 540, 541, 575, 425/576, 522; 264/538

[56] References Cited

U.S. PATENT DOCUMENTS 4,321,029 3/1982 Aoki ........................... 425/523
4,846,661 7/1989 Nakamura et al. ............ 425/534

FOREIGN PATENT DOCUMENTS 0206914 12/1986 European Pat. Off. .
0228324 7/1987 European Pat. Off. .
0288581 11/1988 European Pat. Off. .
0328658 8/1989 European Pat. Off. .
2501572 3/1982 France .

Primary Examiner—Tim Heitbrink
Attorney, Agent, or Firm—Ostrolenk, Faber, Gerb & Soffen

[57] ABSTRACT

A rotary molding machine having an arrangement for securely positioning lip and injection molds independently of the length of the vertical stroke; the arrangement does not require a guiding member for each lip mold. A lip mold is mounted on each of a plurality of sectorial plates so as to be vertically removable with the corresponding sectorial plate. Cylinders for opening and closing the molds are provided on vertically movable tie bars, and means provided for vertically moving the cylinders. An injection mold below the lip mold to close with the lip mold when the cylinders are lowered. A driving arrangement for intermittently rotating the sectorial plates so that after each rotation one lip mold is positioned above the injection mold.

15 Claims, 5 Drawing Sheets

ROTARY INJECTION MOLDING MACHINE

BACKGROUND OF THE INVENTION

The present invention relates to a rotary molding machine for opening and closing molds by raising and lowering a lip mold.

DESCRIPTION OF THE PRIOR ART

The rotary injection blow molding machine disclosed in the official gazette of Japanese Patent Laid-open Application No. 63-116830, having corresponding U.S. Pat. No. 4,846,661, has an intermittently rotatable transfer plate under a base secured at the top of the machine platform, and a vertically movable lip mold under the transfer plate.

The lip mold is normally pressed against the bottom surface of the transfer plate by a spring member. Closing of the lip mold with the injection mold is executed by lowering a core mold, located above the lip mold, to press the lip mold, and then further lowering the core mold together with the lip mold until the lip mold contacts the injection mold.

In such a rotary molding machine, there is no problem when a preform molded by the machine is short in length, and the lip mold has a short vertical stroke. However, when the length of the vertical stroke increases, horizontal displacement can easily occur. Therefore, it is necessary to provide means for the alignment of the lip mold and injection mold because the closing of the molds is executed against the pressure of the spring.

A guiding member for closing the molds consists of a rod having a length corresponding to the length of the vertical stroke. However, installation of the guiding member is difficult because a base and a core. mold elevator are also mounted on the transfer plate, and a guiding member must be installed for each lip mold. Therefore, the structure is complex and the cost of the machine increases as compared with a rotary molding machine for opening and closing molds by providing means for raising and lowering the core-mold and the lip-mold at the injection mold side of the transfer plate.

SUMMARY OF THE INVENTION

An object of the present invention is to provide a rotary molding machine capable of securely positioning the lip mold and injection mold independent of the length of the vertical stroke, and having a new arrangement that does not require a guiding member for each lip mold.

A rotary molding machine of the present invention comprises a base secured at the top of a machine platform;

a doughnut-like transfer plate formed by assembling the required number of sectorial plates under the base so that each of the sectorial plates can vertically move;

an annular gear being between the transfer plate and the base, to which each of the sectorial plate are removably connected by connectors;

a driving arrangement on the base for intermittently rotating, through a gear, the annular gear with the transfer plate;

a lip mold mounted under each of the sectorial plates;

an injection mold mounted on the machine platform at a stop position of the lip mold;

movable tie bars for clamping set at three positions on the circumference of the injection mold by passing the tie bars through the base from the machine platform;

a clamping board secured at the top of the tie bars; and a core mold mounted under the clamping board;

wherein cylinders for opening and closing the molds are set under the plate of each of the movable tie bars so that they can vertically move by securing a piston ring to the tie bars and catching members for raising and lowering the plates are mounted at the top of the cylinders.

In operation, a lip mold is transferred to a position above the injection mold together with the corresponding sectorial plate by rotating the annular gear with the driving arrangement. When the lip mold is located on the catching members, the transfer plate stops rotating and the sectorial plate corresponding to the lip molds is caught by the catching members.

Next, after the transfer plate stops, the clamping board is lowered, for clamping together with the movable tie bars, by applying a fluid pressure to the upside of the cylinders. As a result, the piston ring side is lowered together with the movable tie bars while the cylinders keep their position together with the catching members.

Thus, the lip mold and core mold are closed and the lip mold is pressed by the core mold. When the fluid pressure applied to the cylinders is changed from the upper side to the lower side, the cylinders are lowered together with the tie bars, the sectorial plate supported by the catching member is also lowered to a position where the sectorial plate contacts the top surface of the injection mold, and the lip mold and injection mold are thereby closed.

When the movable tie bars and the clamping board are moved up after the injection molding is executed, the movable tie bars rise while the cylinders keep their position. Then, the cylinders rise together with the movable tie bars to open the molds, and the sectorial plate returns to its original position together with the catching member.

Other features and advantages of the present invention will become apparent from the following description of the invention which refers to the accompanying drawings.

BRIEF DESCRIPTION OF THE DRAWING(S)

DETAILED DESCRIPTION OF A PREFERRED EMBODIMENT

Figure 1:
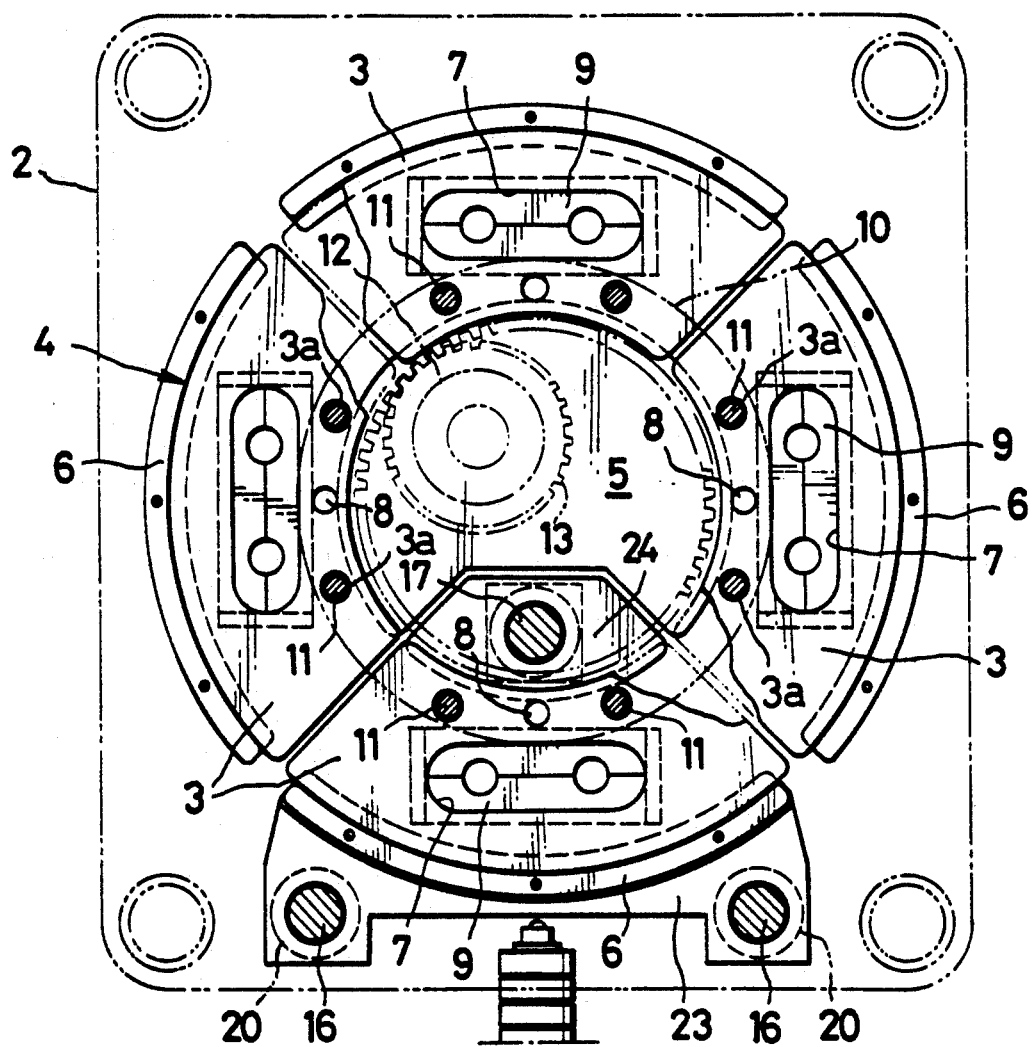
FIG. 1 is a plan view of a rotary molding machine according to an embodiment of the present invention.
Figure 2:
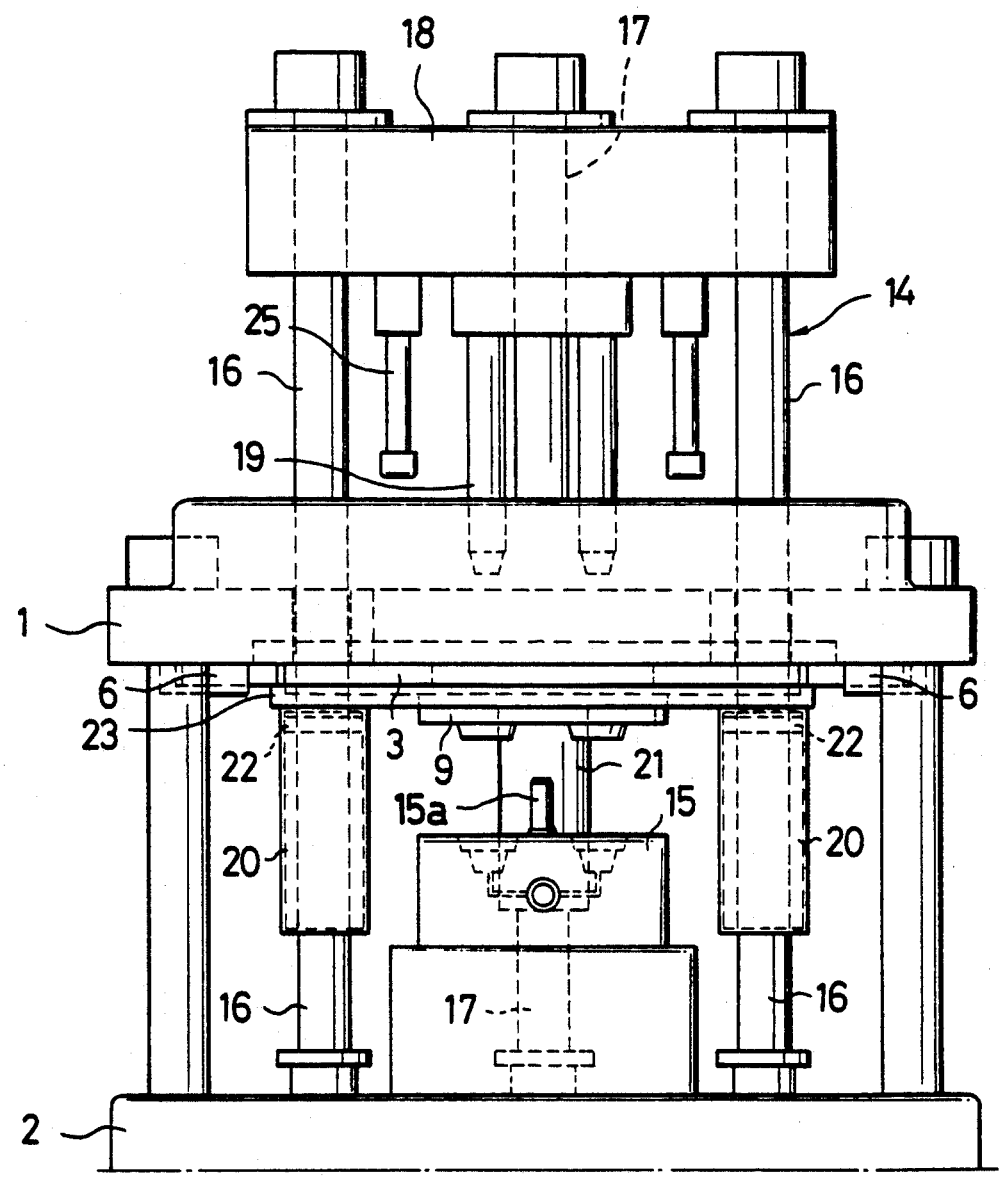
FIG. 2 is a front view of the injection molding section.

In FIG. 2, a base 1 is secured to the upper side of a machine platform 2. As shown in FIG. 1, the base 1 includes a circular transfer plate 4, formed like a doughnut, by assembling four sectorial plates 3 under the base 1 so that each of them can vertically move. The transfer plate 4 is rotatably supported at the base side by the members 5, 6 arranged at the inner and the outer periphery of the transfer plate 4, respectively.

Each of the sectorial plates 3 has a slot 7 and a positioning hole 8 on its surface. A split lip mold 9 is set under each sectorial plate 3 at the slot 7. A fitting through hole 3a is provided on the surface of each sectorial plate 3 at both sides of the positioning hole 8 for connectors 11. The connectors 11 connect the respective sectorial plate 3 with an annular gear 10. The annular gear 10 is rotatably mounted between the base 1 and the transfer plate 4.

The annular gear 10 has teeth on the inside; the teeth of annular gear 10 are engaged with gear 13 of a driving arrangement 12, mounted on the base 1, to intermittently rotate the annular gear 10 together with the sectorial plates 3. The sectorial plates 3 are rotated 90 degrees for each intermittent rotation.

FIG. 2 shows a clamping arrangement 14 comprising an injection mold 15 mounted on the machine platform 2 at a stop position of the lip mold 9. External movable tie bars 16, 16 and an internal movable tie bar 17 are respectively set at three positions on the circumference of the injection mold 15 by passing them through the base 1 from the machine platform 2 so that they can vertically move. A clamping board 18 is secured to the upper side of the movable tie bars 16, 17. A core mold 19 is mounted under the clamping board 18.

Figure 5:
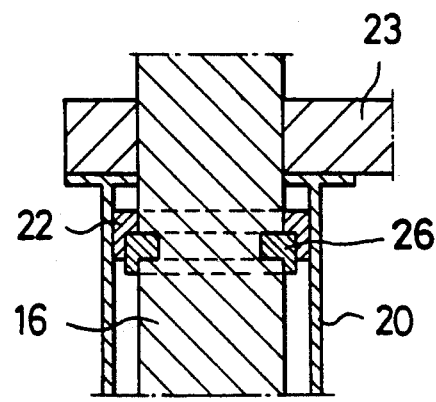
FIG. 5 is a partially sectional view of a movable mold and cylinder.

Pneumatic or hydraulic cylinders 20, 21, for opening and closing molds, are set to the surface under the plates of movable tie bars 16, 17. The cylinders 20, 21 are held by securing a piston ring 22 (FIG. 5) to the ring member 26 provided at the side of the movable tie bars 16, 17 so that the cylinders can vertically slide. Catching members 23, 24 for raising and lowering the plates are also provided at the top of the cylinders 20, 21.

The catching member 23 comprises a plate mounted on the pair of cylinders 20, 20; a part of an external supporting member 6 is mounted on the upper surface of the plate of the catching member 23. The catching member 24, as shown in FIG. 1, comprises a sectorial plate forming a part of the internal supporting member 5. The sectorial plate of the catching member 24 catches a plate 3 together with the catching member 23 and vertically moves together with the cylinders 20, 21.

FIG. 2 shows a pressing member 25 for the plate 3, which is mounted downward on the clamping board 18 together with the core mold 19. When the plate 3 can be smoothly pressed down by the core mold 19, the pressing member 25 may be omitted.

Figure 6:
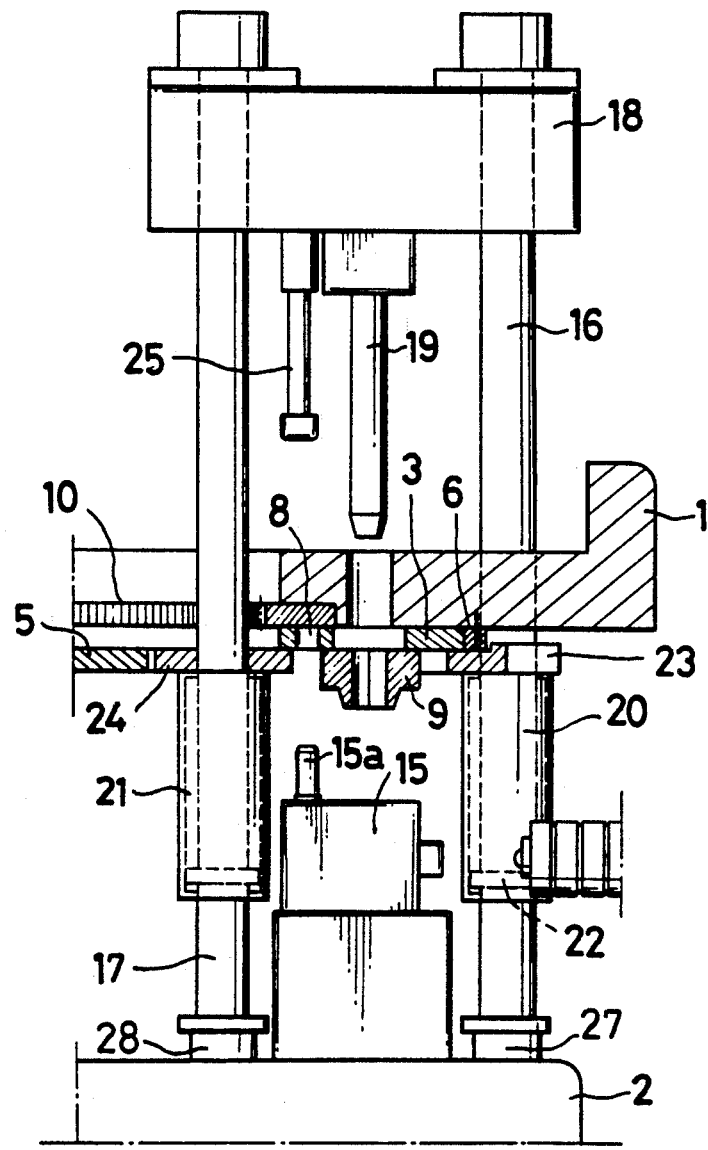
FIG. 6 is a sectional view at center line of FIG. 3 when molds are opened.

Further, the lower ends of the movable tie bars 16, 17 are connected to the respective pistons of hydraulic cylinders 27, 28 (shown in FIG. 6). Though a detailed description of the bottom structure of the movable tie bars 16, 17 is omitted, the structure is the same as the one disclosed in the Japanese Patent Laid-open No. 63-16830, having corresponding U.S. Pat. No. 4,846,661. Vertical movement of the movable tie bars 16, 17 is achieved by hydraulic pressure.

The following is a description of the operation for opening and closing the lip mold 9 and the injection mold 15:

The annular gear 10 is rotated by 90 degrees together with the transfer plate 4 by the driving arrangement 12. After the rotation one plate 3 is always located on the catching members 23, 24 as shown in FIG. 1. At the stop position after rotation, the plate 3 is caught by the catching members 23, 24 and the lip mold 9 remains above the injection mold 15.

Figure 3:
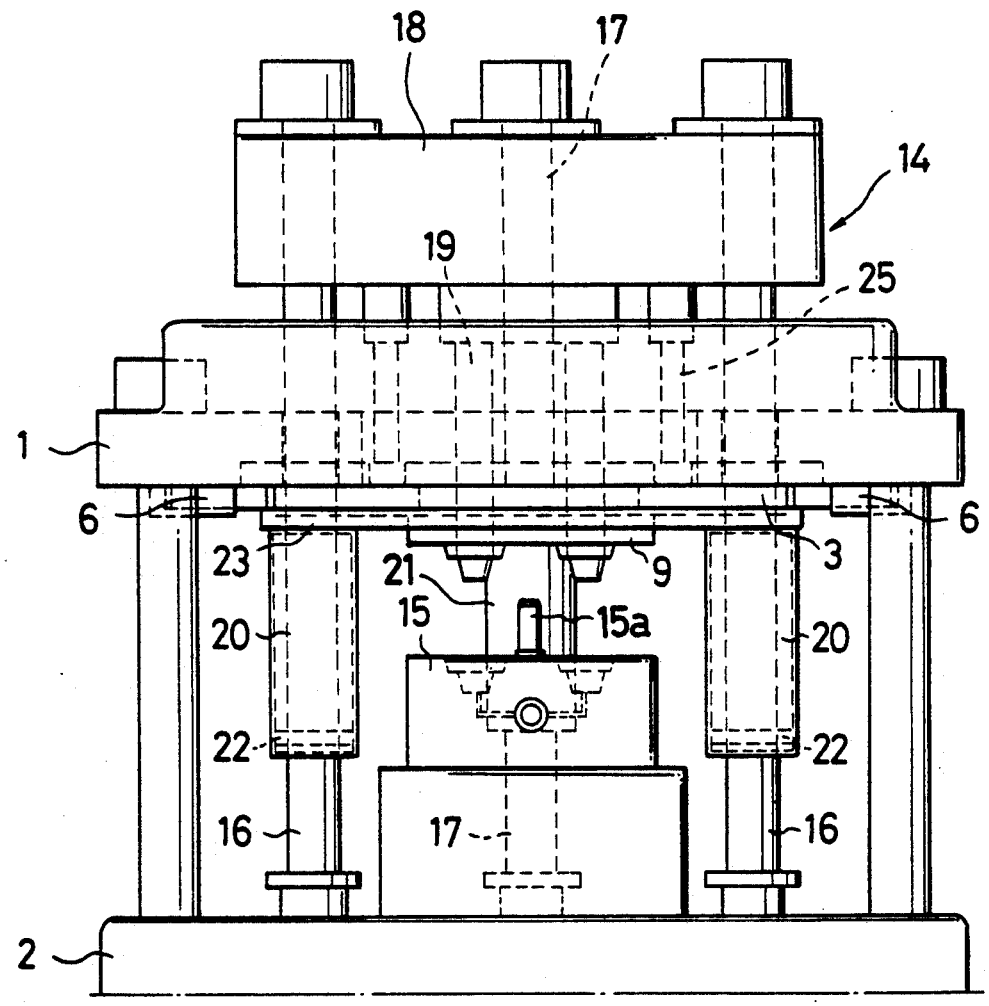
FIG. 3 is a front view of the injection molding section when lip and core molds close.

A fluid pressure is then applied to the upside of the cylinders 20, 21. The clamping board 18 is lowered together with the movable tie bars 16, 17 (through the application of hydraulic pressure in the hydraulic cylinders 27, 28) in order to execute clamping. The piston ring 22 is lowered together with the movable tie bars 16, 17, but the cylinders 20, 21 keep their position (because of the fluid pressure applied) together with the catching members 23, 24. As shown in FIG. 3, the lip mold 9 and core mold 19 close, and the core mold 19 and pressing member 25 press the lip mold 9 and the plate 3.

The fluid pressure applied to the cylinders 20, 21 is then changed from the upper side to the lower side, while the lip mold 9 and plate 3 are pressed. The cylinders 20, 21 are lowered together with the movable tie bars 16, 17, and the catching members 23, 23 are also lowered while supporting the plate 3.

Figure 4:
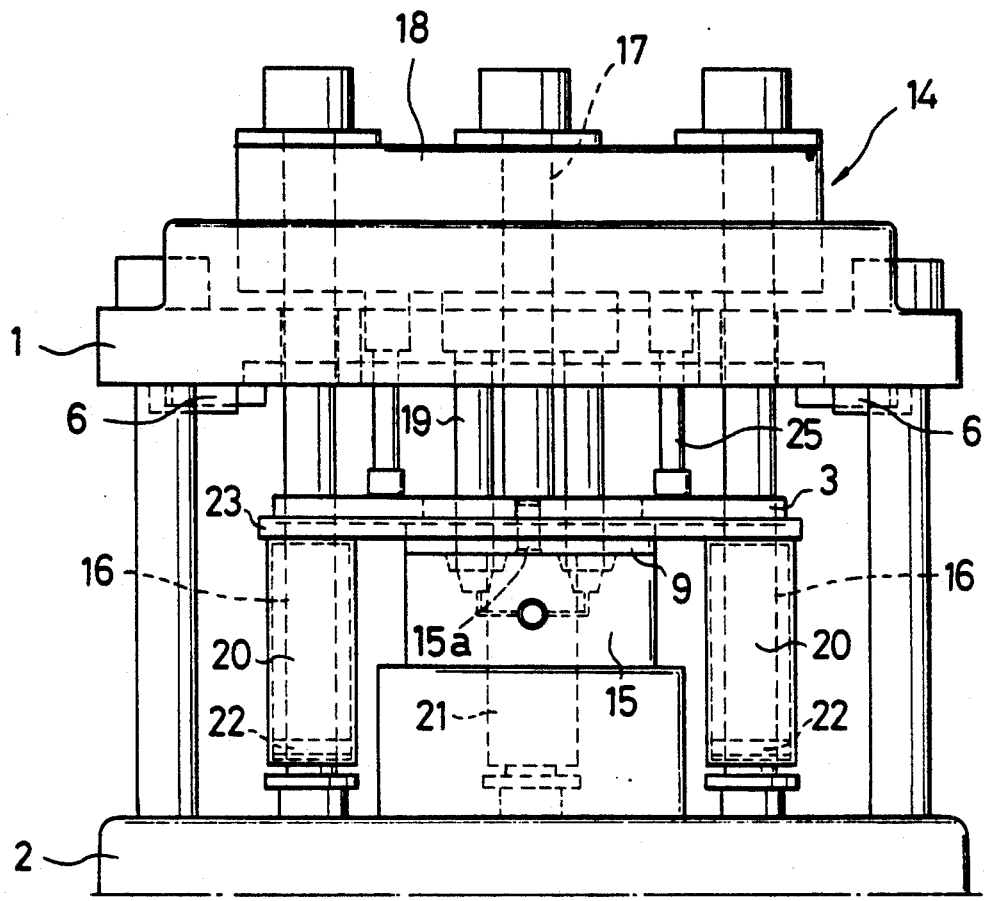
FIG. 4 is a front view of the injection molding section when lip and injection molds close.

As a result of the lowering of the plate 3, the connectors 11 are removed from the surface of the plate 3 and separate from the annular gear 10. The lip mold 9 and injection mold 15 then close as shown in FIG. 4. When the molds 9, 15 close, the positioning pin 15a at the top of the injection mold 15 is fitted into the positioning hole 8.

After the injection molding, the movable tie bars 16, 17 and the clamping board 18 are moved upward. The movable tie bars 16, 17 rise while the cylinders 20, 21 remain in their position. Next, the cylinders 20, 21 rise, together with the movable tie bars, to open the molds 9, 15, and the plate 3 returns to its original position together with the catching members 23, 24. The connectors 11 are then fitted onto the plate 3 surface again to start the rotational movement by the annular gear 10.

As described above, the present invention does not require a mold opening and closing or guiding member for each lip mold.

Moreover, because the molds 9, 15 can be opened or closed by vertically moving the movable tie bars 16, 17 and the cylinders 20, 21 fitted around the tie bars 16, 17, the lip mold 9 can be moved vertically to the injection mold 15 independent of the length of the opening and closing stroke. Furthermore, positioning for opening and closing the molds 9, 15 is easily executed even if the transfer plate 4 consists of a plurality of plates. Therefore, it is possible to form a bottle requiring a long preform.

Furthermore, because the guiding member does not protrude from the transfer plate 4, unlike the conventional type of machine, it is not necessary to form a space for moving the guiding member on the base and to reinforce the base, thereby simplifying the base structure further. Therefore, the present invention has the advantages that manufacturing is simplified and the manufacturing cost decreased.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rotary molding machine, comprising:
   a machine platform and a base mounted above said platform and separated therefrom;

a transfer plate having a raised position under said base, said transfer plate formed by a plurality of sectorial plates, each of said sectorial plates being adapted for holding respective lip molds to be vertically removable with the corresponding sectorial plate from said raised position to a lowered position above said machine platform;

an injection mold located at said lowered position to close with said lip molds;

means for vertically removing said sectorial plate; and driving means for intermittently rotating said transfer plate through a predetermined degree of rotation so that after each said intermittent rotation at least one of said lip molds lies above said injection mold and in position to be lowered so as to be closed with said injection mold.

2. A rotary molding machine claimed in claim 1, wherein said means for vertically removing said secretorial plates include tie bars extending from said machine platform through said base, said tie bars being capable of moving vertically between a raised and a lowered position; a clamping board at the top of said tie bars and a corn mold under said clamping board so that lowering said clamping board clamps together said lip mold and said core mold; cylinders on said vertically moveable tie bars, and means for vertically moving said cylinders to open and close said lip mold and said injection mold.

3. A rotary molding machine claimed in claim 2, wherein said means for vertically moving said cylinders is a pneumatic arrangement having a piston ring secured to said tie bars.

4. A rotary molding machine claimed in claim 2, wherein said means for vertically moving said cylinders is a hydraulic arrangement having a piston ring secured to said tie bars.

5. A rotary molding machine claimed in claim 2, wherein said driving means comprises an annular gear disposed at a level between said sectorial plates and said base, connectors for removably connecting said annular gear to each of said sectorial plates and a driving arrangement at said base for intermittently rotating said annular gear and thereby rotating said sectorial plates.

6. A rotary molding machine having an arrangement for vertically moving a lip mold to open and close with an injection mold, said rotary molding machine comprising:

a machine platform and a base mounted above said platform and separated therefrom;

a transfer plate having a raised position under said base, said transfer plate formed by a plurality of sectorial plates, each of said sectorial plate being adapted for holding a respective lip mold to be vertically removable with the corresponding sectorial plate from said raised position to a lowered position above said machine platform; an injection mold located at said lowered position to close with said lip mold;

the arrangement for moving the lip mold comprising tie bars extending from said machine platform through said base, said tie bars being capable of moving vertically between a raised position and a lowered position;

a clamping board at the top of said tie bars and a core mold under said clamping board so that lowering said clamping board clamps together said lip mold and said core mold; cylinders on said vertically moveable tie bars, and means for vertically moving said cylinders to open and close said lip mold and said injection mold;

catching members on said cylinders for holding said corresponding sectorial plate when the lip mold is closed with said injection mold;

an annular gear disposed at a level between said sectorial plates and said base, and connectors for removably connecting said annular gear to each of said sectorial plates; and a driving arrangement at said base for intermittently rotating said annular gear and thereby rotating said transfer plate through a predetermined degree of rotation so that after each said intermittent rotation one lip mold lies above said injection mold and in position to be lowered so as to be closed with said injection mold.

7. A rotary molding machine claimed in claim 6, wherein said driving arrangement includes a gear, said gear meshing with said annular gear to intermittently rotate said annular gear.

8. A rotary molding machine claimed in claim 6, wherein said injection mold is mounted on said machine platform.

9. A rotary molding machine claimed in claim 6, wherein said vertically moveable tie bars are set at three positions around a circumference of said injection mold; each tie bar having one of said cylinders.

10. A rotary molding machine claimed in claim 9, wherein said catching members are situated on top of said cylinders and said tie bars extend through said catching members.

11. A rotary molding machine claimed in claim 10, wherein each sectorial plate has an inner edge and an outer edge, said catching members comprise a first plate provided at the top of two of the three cylinders so as to support said corresponding sectorial plate at said outer edge; and a second plate provided at the top of the third of the cylinders so as to support said corresponding sectorial plate at said inner edge.

12. A rotary molding machine claimed in claim 6, wherein said means for vertically moving said cylinders is a pneumatic arrangement having a piston ring secured to said tie bars.

13. A rotary molding machine claimed in claim 6, wherein said means for vertically moving said cylinders is a hydraulic arrangement having a piston ring secured to said tie bars.

14. A rotary molding machine claimed in claim 6, wherein said clamping board includes a pressing member mounted near said core mold for pressing said sectorial plate corresponding to said lip mold positioned to be vertically removed to close with said injection mold.

15. A rotary molding machine claimed in claim 6, wherein each of said sectorial plates of said transfer plate has through holes for connecting with said connectors, and further having a positioning hole, a positioning pin provided at said injection mold for fitting with said positioning hole when said corresponding lip mold is lowered to close with said injection mold.

* * * * *